US012712892B2

(12) United States Patent
Trabelsi et al.

(10) Patent No.: US 12,712,892 B2
(45) Date of Patent: Aug. 18, 2026

(54) SYSTEM AND METHOD FOR CYBERSECURITY TOXIC COMBINATION PRECOGNITION

(71) Applicant: Wiz, Inc., New York, NY (US)

(72) Inventors: Arnon Trabelsi, Tel Aviv (IL); Or Heller, Tel Aviv (IL); Amir Lande Blau, Tel Aviv (IL); Alon Weiss, Tel Aviv (IL); Daniel Hershko Shemesh, Givat-Shmuel (IL); Tom Feigin, Tel Aviv (IL); Gahl Saraf, Givatayim (IL); Roy Iarchy, Givatayim (IL); Or Bin, Rishon LeZiyon (IL); Raz Hillel, Givatayim (IL); Assaf Avital, Ramat Gan (IL); Benny Holtzer, Ramat Gan (IL)

(73) Assignee: Wiz, Inc., New York, NY (US)

( * ) Notice: Subject to any disclaimer, the term of this patent is extended or adjusted under 35 U.S.C. 154(b) by 50 days.

(21) Appl. No.: 18/659,760

(22) Filed: May 9, 2024

(65) Prior Publication Data

US 2025/0350610 A1 Nov. 13, 2025

(51) Int. Cl.
*H04L 9/40* (2022.01)
*G06F 21/55* (2013.01)

(52) U.S. Cl.
CPC ........ *H04L 63/1416* (2013.01); *G06F 21/554* (2013.01)

(58) Field of Classification Search
CPC ........................... H04L 63/1416; G06F 21/554
See application file for complete search history.

(56) References Cited

U.S. PATENT DOCUMENTS

| | | | | |
|---|---|---|---|---|
| 10,063,570 | B2 | 8/2018 | Muddu et al. | |
| 10,505,953 | B2 | 12/2019 | Cohen et al. | |
| 2022/0156380 | A1 * | 5/2022 | Pradzynski | G06F 21/577 |
| 2023/0048653 | A1 * | 2/2023 | Tripathi | G06F 8/60 |
| 2024/0104235 | A1 * | 3/2024 | Herzberg | G06F 21/577 |
| 2024/0232134 | A1 * | 7/2024 | Katuri | G06F 16/125 |

* cited by examiner

*Primary Examiner* — Bryan Y Lee
(74) *Attorney, Agent, or Firm* — M&B IP Analysts, LLC

(57) ABSTRACT

A system and method for detecting a cybersecurity toxic combination prior to a virtual instance deployment is presented. The method includes: inspecting an entity in a cloud computing environment for a cybersecurity object, the cybersecurity object; detecting the cybersecurity object on the inspected entity; inspecting a code object utilized to deploy a virtual instance in the cloud computing environment prior to deployment of the virtual instance; detecting a toxic combination cybersecurity issue based on the cybersecurity object and the code object; and initiating a mitigation action on the code object.

21 Claims, 5 Drawing Sheets

SYSTEM AND METHOD FOR CYBERSECURITY TOXIC COMBINATION PRECOGNITION

TECHNICAL FIELD

The present disclosure relates generally to cybersecurity, and specifically to detecting cybersecurity risk based on toxic combinations.

BACKGROUND

Predicting cybersecurity problems presents a multifaceted challenge due to the constantly evolving nature of cyber threats and the complex interplay of technological, human, and organizational factors. One significant issue lies in the sheer volume and diversity of potential threats. Cyber attackers continuously develop new tactics, techniques, and procedures (TTPs) to exploit vulnerabilities in systems and networks, making it difficult to anticipate specific attack vectors or scenarios. Moreover, the rapid pace of technological innovation introduces new attack surfaces and vulnerabilities faster than security professionals can effectively address them.

Additionally, the interconnectedness of modern IT infrastructures exacerbates the problem. As organizations adopt cloud computing, Internet of Things (IoT) devices, and interconnected supply chains, the attack surface expands, creating more entry points for cyber threats. Predicting how vulnerabilities in one system may cascade across interconnected systems adds another layer of complexity to threat prediction.

To address these challenges, cybersecurity professionals increasingly rely on data-driven approaches, such as threat intelligence analysis and machine learning algorithms, to identify patterns and anomalies indicative of potential cyber threats. However, predicting cybersecurity problems remains an ongoing challenge that requires a holistic understanding of the evolving threat landscape and proactive risk management strategies.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting an entity in a cloud computing environment for a cybersecurity object, the cybersecurity object. Method may also include detecting the cybersecurity object on the inspected entity. Method may furthermore include inspecting a code object utilized to deploy a virtual instance in the cloud computing environment prior to deployment of the virtual instance. Method may in addition include detecting a toxic combination cybersecurity issue based on the cybersecurity object and the code object. Method may moreover include initiating a mitigation action on the code object. Other embodiments of this aspect include corresponding computer systems, apparatus, and computer programs recorded on one or more computer storage devices, each configured to perform the actions of the methods.

Implementations may include one or more of the following features. Method may include: initiating the mitigation action to stop deployment of the virtual instance based on the code object. Method may include: generating a representation of the computing environment in a security database based on an unified data schema; and generating a representation of: the inspected entity, the cybersecurity object, the code object, and the toxic combination cybersecurity issue in the security database. Method may include: detecting in the code object a second cybersecurity object, the second cybersecurity object indicating a toxic combination with the detected cybersecurity object. Method may include: generating a new code object based on the code object; and removing the second cybersecurity object from the new code object. Method may include: initiating a remediation action based on the detected cybersecurity object on the inspected entity. Method may include: generating an inspectable disk based on an original disk connected to the inspected entity; inspecting the inspectable disk for the cybersecurity object. Method may include: releasing the inspectable disk in response to determining that inspection is completed. Method may include: accessing an infrastructure as code (IaC) environment, the IaC environment including a plurality of code objects, each code object corresponding to a deployable virtual instance; and inspecting each code object of the plurality of code objects. Method may include: determining for each code object a potential toxic combination issue based on the each code object and an entity in the cloud computing environment. Implementations of the described techniques may include hardware, a method or process, or a computer tangible medium.

In one general aspect, non-transitory computer-readable medium may include one or more instructions that, when executed by one or more processors of a device, cause the device to: inspect an entity in a cloud computing environment for a cybersecurity object, the cybersecurity object; detect the cybersecurity object on the inspected entity; inspect a code object utilized to deploy a virtual instance in the cloud computing environment prior to deployment of the virtual instance; detect a toxic combination cybersecurity issue based on the cybersecurity object and the code object; and initiate a mitigation action on the code object. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect an entity in a cloud computing environment for a cybersecurity object, the cybersecurity object. System may in addition detect the cybersecurity object on the inspected entity. System may moreover inspect a code object utilized to deploy a virtual instance in the cloud computing environment prior to deployment of the virtual instance. System may also detect a toxic combination cybersecurity issue based on the cybersecurity object and the code object. System may furthermore initiate a mitigation action on the code object. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: initiate the mitigation action to stop deployment of the virtual instance based on the code object. System where the memory contains further instructions which when executed by the processing circuitry further configure the system to: generate a representation of the computing environment in a security database based on an unified data schema; and generate a representation of: the inspected entity, the cybersecurity object, the code object, and the toxic combination cybersecurity issue in the security database. System where the memory contains further instructions which when executed by the processing circuitry further configure the system to: detect in the code object a second cybersecurity object, the second cybersecurity object indicating a toxic combination with the detected cybersecurity object. System where the memory contains further instructions which when executed by the processing circuitry further configure the system to: generate a new code object based on the code object; and remove the second cybersecurity object from the new code object. System where the memory contains further instructions which when executed by the processing circuitry further configure the system to: initiate a remediation action based on the detected cybersecurity object on the inspected entity. System where the memory contains further instructions which when executed by the processing circuitry further configure the system to: generate an inspectable disk based on an original disk connected to the inspected entity; and inspect the inspectable disk for the cybersecurity object. System where the memory contains further instructions which when executed by the processing circuitry further configure the system to: release the inspectable disk in response to determining that inspection is completed. System where the memory contains further instructions which when executed by the processing circuitry further configure the system to: access an infrastructure as code (IaC) environment, the IaC environment including a plurality of code objects, each code object corresponding to a deployable virtual instance; and inspect each code object of the plurality of code objects. System where the memory contains further instructions which when executed by the processing circuitry further configure the system to: determine for each code object a potential toxic combination issue based on the each code object and an entity in the cloud computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
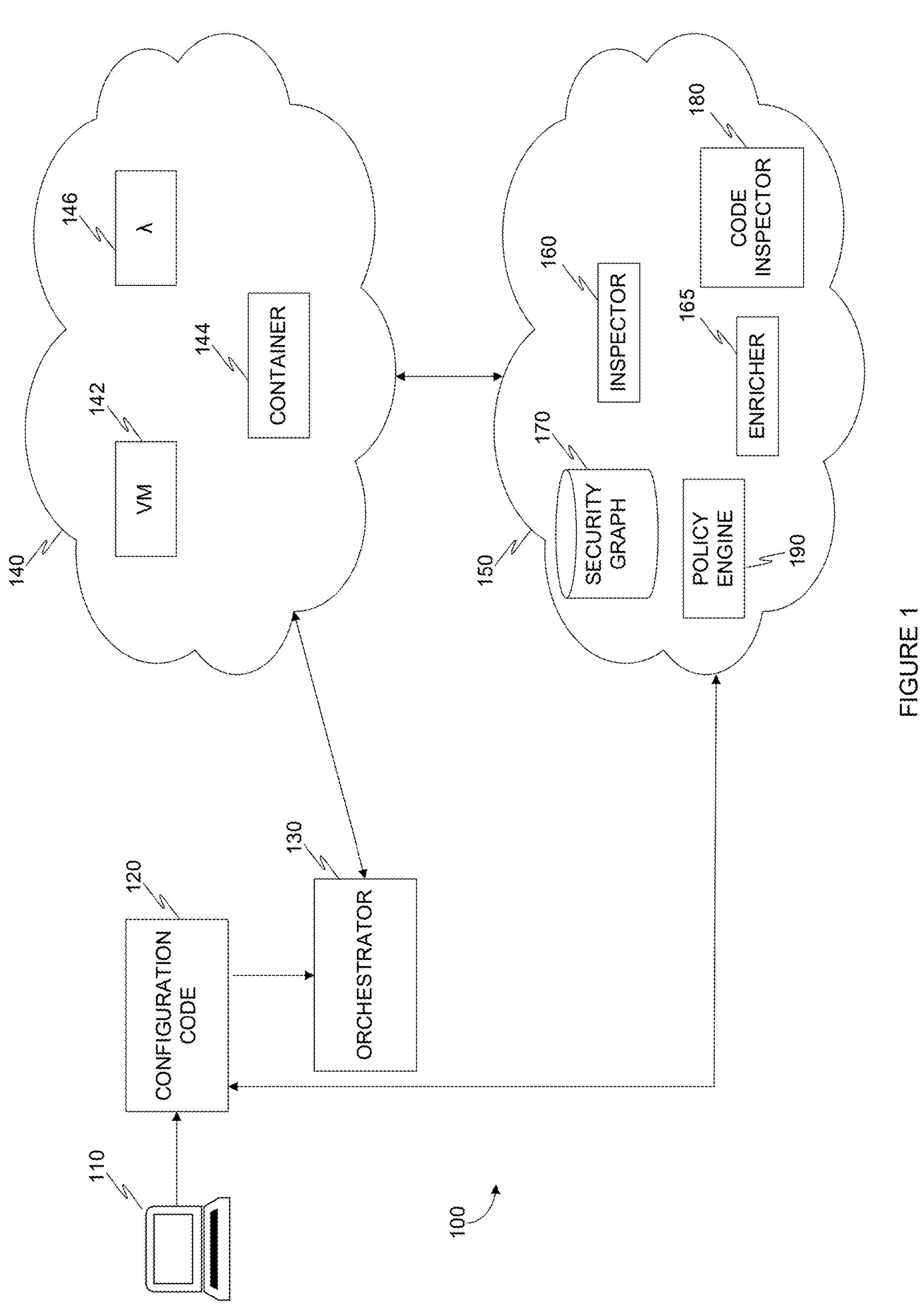
FIG. 1 is a network diagram of a monitored cloud computing environment utilizing infrastructure as code (IaC) utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Infrastructure as code (IaC) allows fast and reliable deployment of workloads and accounts in cloud-based computing environments. A workload may be, for example, a virtual machine, a container, or a serverless function. A virtual machine may be implemented for example as an Oracle® VM VirtualBox hypervisor, a container may be implemented on a Kubernetes® platform, and serverless function may be implemented as Amazon® Web Services (AWS) Lambda. Accounts may be user accounts, service accounts, roles, and the like.

Typically, the deployed environment, also known as a production environment, differs over time from the initial deployment configuration, due for example to upgrades and patches implemented in production but not always updated in configuration code. This can occur for example due to human error. Furthermore, many deployment environments utilize a continuous integration, continuous deployment (CI/CD) approach, for which a plurality of deployment environments are used. A cloud computing environment is designed, in an embodiment, utilizing infrastructure as code tool and other development tools in a development (i.e., dev) environment, and deployed to a test environment where code is tested. In an embodiment, code which passes tests, benchmarks, and the like, is then deployed to a staging environment which is similar to the production environment. In each of these environments, a single code object can correspond to multiple machines which are deployed based on the code object, each of which can be host to cybersecurity vulnerabilities. For example, a code object includes a code instruction which when executed to deploy a workload, configures a workload having a misconfiguration. If the misconfiguration is detected and corrected in the production environment, the code remains faulty and therefore the next machine deployed based off of the code will also have a misconfiguration.

In an embodiment, a security graph includes a representation of a production environment. The security graph is utilized in inspecting the configuration code to ascertain that code objects comply with the specification of the production environment. For example, the security graph is queried, in an embodiment, to detect a node representing a workload, which corresponds to an identifier of a code object. By utilizing information represented in the security graph of the production environment and applying it to code objects, cybersecurity threats can be detected faster, and to the point where they originate.

Alerts may be generated to indicate that the configuration code would result in a new production environment which is deficient, for example due to vulnerability, when compared with the current production environment.

In some embodiments a security graph representing a cloud computing environment is populated with data from a configuration code from which the cloud computing environment was deployed. In certain embodiments the security graph further includes an enrichment layer generated from data extracted from the configuration code. In some embodiments the enrichment layer includes nodes representing enrichment data, such as public network access. In an embodiment, the enrichment layer includes data values which are used to populate nodes in the security graph based on extracting the values from the configuration code. Providing the enriched data to the security graph allows improved detection of cybersecurity issues, while the methods disclosed herein provide for a compact representation of this data, which decreases use of storage in a graph database used to store the data.

While declaratory code is used precisely because it is intuitive for humans to read and write declaratory code, it should be appreciated that inspecting such code for cybersecurity issues is not a task that can be performed by humans. Specifically, inspecting code to detect a cybersecurity issue needs to be performed in a reliable and consistent manner, and done so repeatedly over often thousands of lines of code. Even if it were practical for a human to read through thousands of lines of computer code within any meaningful time frame (cloud computing environments are elastic and constantly changing), doing so while searching for hundreds of thousands of various cybersecurity issues is impossible. Furthermore, humans are not capable of performing such tasks repeatedly and reliably, as they apply objective standards to what is a cybersecurity issue.

By contrast, an embodiment of the system disclosed herein applies objective criteria in detection of cybersecurity issues, and does so in a manner which is reliable, consistent, and in a timeframe which is relevant to the operation of a cloud computing environment. Additionally, methods disclosed herein provide for improved efficiency of computer systems, by reducing use of memory, processors, and the like.

FIG. 1 is a network diagram 100 of a monitored cloud computing environment utilizing infrastructure as code (IaC) utilized to describe the various embodiments.

A client device 110 generates a configuration code file 120 based on input from one or more users (e.g., software programmers). In an embodiment, a client device is a personal computer, a tablet, a laptop, and the like. In some embodiment, a client device 110 is used to access a server (not shown) which provides a computing environment into which input can be provided. It should be apparent that the client device 110 is shown here for simplicity and pedagogical purposes, and that the configuration code file 120 is generated, in other embodiments, by the client device, a virtual workload in a cloud computing environment, a combination thereof, and the like. In certain embodiments, the configuration code file 120 is generated by multiple different client devices. For example, a plurality of users may each utilize a different client device and update a single configuration code file 120, for example, with code objects. In some embodiments, a single client device 110 generates multiple configuration code files.

In an embodiment the configuration code file 120 is implemented in a declaratory computer language. In a declaratory computer language, a user declares resources they would like to have as code objects, and an orchestrator, such as orchestrator 130, is configured to deploy workloads in a cloud computing environment based on the declarations. For example, an orchestrator 130 is configured, in an embodiment, to translate a declaratory code to a configuration code, which includes instructions which when executed configure a cloud computing environment to deploy a workload, virtual instance, and the like.

In certain embodiments, multiple configuration code files 120 may be utilized. For example, a user may operate multiple cloud environments, each with its own configuration code. For example, a first configuration code file is directed to deploying a cloud computing environment over Microsoft® Azure, while a second configuration code file is directed to deploying a cloud computing environment over Amazon® Web Services (AWS).

As another example, a user can declare a first resource type (e.g., virtual machine) for a first cloud environment (e.g., AWS) and for a second cloud environment (Google® Cloud Platform—GCP) in a first configuration code file, and a second resource type (e.g., software container) for the first cloud environment (AWS) and the second cloud environment (GCP) in a second configuration code file.

In an embodiment, an orchestrator 130 is configured to receive the configuration code file 120. In certain embodiments, the orchestrator 130 is configured to initiate actions in a cloud computing environment 140, for example, to deploy workloads, instances, user accounts, service accounts, combinations thereof, and the like, based on declarations of the configuration code file 120. In an embodiment, an instance is a virtual instance, and may be, for example a virtual machine 142, software container 144, a serverless function 146, and the like.

In some embodiments, the orchestrator 130 is configured to deploy workloads by assigning (also known as provisioning) cloud computing environment resources, such as processors, memory, storage, etc. to the workload. In an embodiment, workloads are deployed in a production environment, which is a cloud computing environment having operable code, used for providing access to data and providing software services. In some embodiments, configuration code is implemented in a development (dev) environment, which also utilizes a cloud computing environment.

In some embodiments, a plurality of workloads are associated with a first code object (not shown) of the configuration code file 120. Workloads which are all deployed based on a same code object (i.e., the first code object) are known as a virtual instance (or "instance") of the first code object. In an embodiment, associating a workload with a code object includes assigning a name to the instance based on an identifier of the code object.

This provides an advantage where it is required to deploy multiple instances which share similar configurations, such as web servers providing access to a website. Rather than configure each instance manually and individually, an orchestrator 130 is configured to deploy a number of the same workload based on the configuration code file 120.

In some embodiments the orchestrator 130 may configure a cloud-native orchestrator (not shown) in the cloud computing environment 140 to deploy the instances. This may be advantageous, for example, where instances need to be deployed in different cloud environments.

For example, the same instances may be deployed simultaneously on Google® Cloud Platform (GCP), Amazon Web Services (AWS), or Microsoft® Azure. This can be achieved by configuring the orchestrator 130 to generate native instructions for a cloud native orchestrator in each environment to deploy such instances. The native instructions are generated by the orchestrator 130 in an embodiment. The instructions are generated based on objects detected in the configuration code file 120.

This method of deploying instances decreases errors by eliminating the need for a user to manually deploy each instance and configure each instance separately, and is also thus a faster method of deployment. A human is not able to consistently and reliably initiate deployment of virtual instances, and then configure hundreds or thousands of such instances to match the same specification. In the example above a first load balancer may be deployed in a first cloud computing environment, and a second load balancer may be deployed in a second cloud computing environment, each cloud computing environment having different infrastructure from each other, wherein the first load balancer and the second load balancer are deployed based on the same code object from a configuration code file.

In an embodiment, the first cloud computing environment 140 is coupled with a second cloud computing environment 150, which is configured to inspect the first cloud computing environment 140 for cybersecurity threats. In an embodiment, the second cloud computing environment 150 (also referred to as inspection environment 150) is further configured to receive the configuration code file 120.

In some embodiments, the second cloud environment 150 is utilized for inspecting the first cloud computing environment 140 and generating cybersecurity risk assessments for instances deployed in the first cloud computing environment 140.

In certain embodiments, the second cloud environment 150 includes a plurality of inspectors, such as inspector 160. An inspector is a workload which is configured to inspect another workload for cybersecurity objects, such as a secret, a file, a folder, a registry value, a weak password, a certificate, a malware object, a hash, a misconfiguration, a vulnerability, an exposure, a combination thereof, and the like. In an embodiment, an inspector 180 is configured to inspect for a plurality of cybersecurity object types.

For example, in an embodiment, an inspector is configured to inspect the virtual machine 142 for a predetermined cybersecurity object, in response to receiving an instruction to inspect the virtual machine 142. In an embodiment the instruction is received through an API (not shown) of the first cloud computing environment 140. In some embodiments, an inspectable disk is generated based on a volume (not shown) attached to the virtual machine 142, and the inspectable disk is provided to the second cloud computing environment 150 for inspection. In an embodiment, generating an inspectable disk includes generating a clone of the volume, generating a copy of the volume, generating a snapshot of the volume, and the like. In an embodiment, a software container is deployed in the second cloud computing environment 150 and attached to a volume generated in the second cloud computing environment 150 based on the received snapshot. The inspector 160 is configured, in an embodiment, to inspect the attached volume for a predefined cybersecurity object type. In an embodiment, the inspector 160 is configured to generate data which is stored on a security graph 170. In some embodiments, a node is stored on the security graph 170 to represent an inspected resource. In an embodiment, data generated by the inspector 160 is stored on the node representing the workload which the inspector 160 inspected for a cybersecurity object.

In an embodiment, the security graph 170 is stored on a graph database. The security graph 170 includes a representation of a cloud computing environment. In an embodiment, the representation includes a plurality of nodes, at least a portion of which each represent a resource or a principal. A resource is a cloud entity which provides access to a service, computer hardware (e.g., processor, memory, storage, and the like), and the like. In an embodiment, a resource is a workload, such as a virtual machine, serverless function, software container, and the like. A principal is a cloud entity which is authorized to initiate actions in a cloud computing environment, and is authorized to act on a resource. In an embodiment, a principal is a user account, a user group, a service account, and the like.

In some embodiments, the second cloud computing environment 150 further includes an enricher 165. In an embodiment the enricher 165 is a workload configured to receive the configuration code 120, information from the inspector 160, and the like, and generate an enriched data layer for the risk graph. In an embodiment, information from an inspector 160 includes identifiers of cybersecurity objects detected on a resource.

In an embodiment, the enricher 165 is configured to determine that a particular workload in the first cloud environment 140 is accessible from a public network, such as the Internet. For example, an inspector is configured to detect open ports on a workload, and detects that a port is open on the particular workload, indicating that HTTP communication is available. Another inspector is configured to detect that the particular workload is not behind a firewall, a VPN, or other security layer, has an IP address that is accessible, and the like. In an embodiment this information is stored as data associated with a node representing the particular workload.

In certain embodiments, the security graph 170 further includes enrichment nodes, which represent certain predetermined functionalities, network access, and the like. For example, in an embodiment an enrichment node is generated to represent access to a public network, such as the Internet. Thus, a node representing a workload which has access to a public network, or can be accessed through a public network, is connected in the security graph 170 to an enrichment node representing public network access.

Storing information this way allows each workload node to store less repeating information (i.e., information is deduplicated). For example, if ten different workloads are internet accessible, rather than store the information on each node, the information is stored on a single node (representing public network access), and each of the workload nodes connect to that single node, results in a reduction in the amount of storage required, which allows a more efficient and compact representation. Compact representation allows for representing large scale networks in an efficient manner. The alternative of storing all information for each element, and connections thereof, would increase complexity as network scale grows and quickly become infeasible.

In an embodiment, a code inspector 180 is further deployed in the second cloud computing environment 150.

In some embodiments, a plurality of code inspectors are deployed. In certain embodiments, configuration code is generated by multiple different type of platforms, such as Pulumi®, Terraform®, and the like.

In some embodiments, a first code inspector is configured to inspect configuration code generated using Pulumi®, while a second code inspector is configured to inspect configuration code generated using Terraform®. In an embodiment, the code inspector 180 is realized as a workload, such as an application deployed on a software container, configured to receive configuration code and inspect the configuration code to detect a predetermined type of code object. In an embodiment, a type of code object is, for example, a secret (such as a public key, or a private key), a resource type, an application identifier, a policy identifier, a role identifier, a status of a flag, and the like. A flag status indicates, in an embodiment, that a certain object is allowed to perform certain actions, such as network access, or assume a role, such as an administrator role (in the case of a user or service account).

In an embodiment, the code inspector 180 is configured to match the detected object to a node in the security graph 170. This is discussed in more detail with respect to FIG. 2 below.

Figure 2:
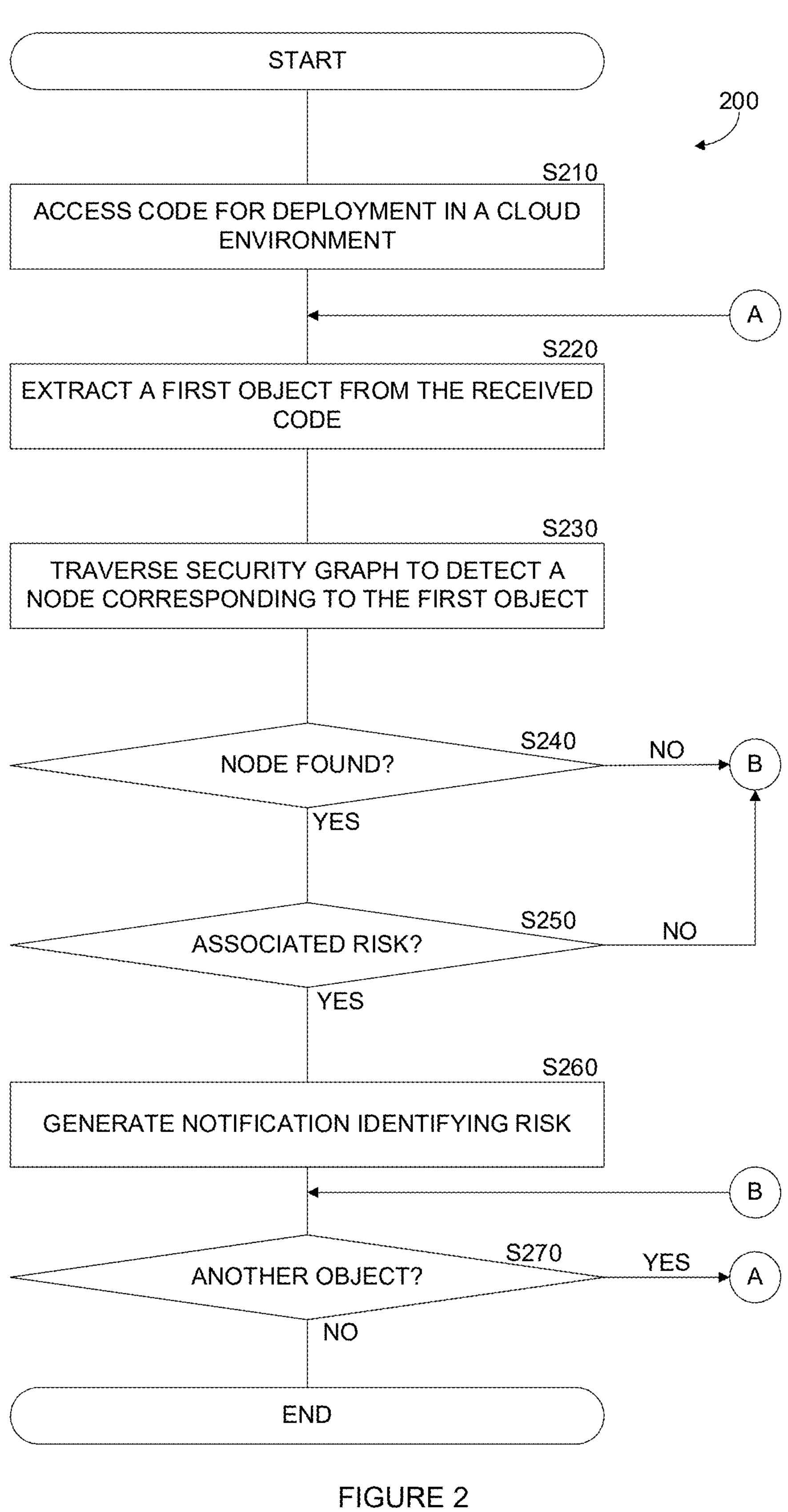
FIG. 2 is an example flowchart of a method for inspecting configuration code utilizing a security graph, implemented in accordance with an embodiment.

FIG. 2 is an example flowchart 200 of a method for inspecting configuration code utilizing a security graph, implemented in accordance with an embodiment. In an embodiment, configuration code in a development (dev) environment is inspected based on a security graph which is generated at least in part based on a production environment.

A production environment is rarely, if at all, identical to the environment which is deployed initially by code. This is due to, for example, upgrades and patches implemented in the production environment to address issues caused by the code deployment. Drifting configuration, or configuration drift, describes how a production environment, over time, 'drifts' further away from the initial configuration code design. Therefore, inspecting only one environment for cybersecurity threats is not enough, and it is advantageous to inspect both.

In an embodiment, the security graph includes representations of the configuration code (e.g., representing code objects) and the production environment (e.g., representing resources and principals). By inspecting a configuration code file based on a security graph generated from data of a production environment, insight can be gained, and deployment issues may be caught early on, for example to identify instances which if deployed based on a current version of configuration code would include a version of software which the production environment has already upgraded to a newer version. In an embodiment, the method is performed by a configuration code inspector, such as the code inspector 180.

At S210, configuration code is received. In an embodiment, the configuration code includes a plurality of code objects. In certain embodiments, a portion of the code objects correspond to instances which are deployed in a cloud computing environment. In an embodiment, the configuration code is scanned or otherwise inspected as a textual object. For example, a configuration code is searched for regular expressions (regex), strings, and the like.

At S220, a first code object is extracted from the received code. Extracting a code object includes, in an embodiment, searching the text of a configuration code file for a predetermined string. For example, a code object may be a text field identifying a type of workload, a name of a workload, a network address, a name in a namespace, a role, a permission, and the like. In some embodiments, a plurality of code objects are extracted from the received code.

At S230, a security graph is traversed to detect a node in the graph corresponding to the extracted first code object. In an embodiment, traversing the security graph includes sending a request through an API of a graph database hosting the security graph to search the graph for a string, a value, and the like, which corresponds to the first code object. For example, if the first code object includes a secret, such as a private key (i.e., an alphanumerical representation), the security graph is traversed to detect a node which represents a matching public key (e.g., public key node). In an embodiment, the public key node is connected to a resource node representing a resource which utilizes the public key.

In some embodiments, a query directed at the security graph includes a plurality of clauses. In an embodiment, multiple-clause query is generated to search for container nodes (i.e., nodes representing containers) which are connected to a node representing the public key. It is noted that detecting a node which corresponds to the extracted first object includes, in an embodiment, detecting a node which is not a node representing a workload corresponding to the first object.

For example, executing code of the first code object results, in an embodiment, in deploying a first load balancer in a virtual private cloud (VPC). In an embodiment, a node is generated in a security graph to represent the first load balancer deployed in a cloud computing environment. The node representing the load balancer is connected to a node representing the VPC.

An advantage of the disclosed method is that attributes of the first code object detected in the graph allows detecting nodes representing cybersecurity issues, nodes representing workloads, enrichment nodes, and the like, prior to the generation of an instance based on the code object. This allows detecting a security risk in an instance prior to it being deployed in a computing environment. In the above example, as the code of the first code object includes instructions to deploy in the VPC, the VPC node is detected (based, for example, on detecting an identifier of the VPC in the code) in the security graph. Cybersecurity risks represented by nodes connected to the VPC node are detected, for example by querying the security graph.

At S240, a check is performed to determine if a node is detected. If 'no' execution may continue at S270. In an embodiment, if a node is not detected (e.g., the node does not exist), a new node is generated in the security graph to represent the first code object. If a node is detected execution continues to S250.

At S250, a check is performed to determine if the detected node corresponds to a previously determined cybersecurity issue, such as a cybersecurity risk factor, vulnerability, misconfiguration, and the like. A risk factor, vulnerability, misconfiguration, and the like, may be, for example, access to a network resource (such as the internet), access from a network resource, outdated software, privilege escalation, and the like. In an embodiment, a risk factor score is further determined. In some embodiments, the score indicates the severity of the risk, such as 'low', 'medium', 'high', and 'critical'. In an embodiment, the previously determined cybersecurity issue is detected by inspecting a disk for a cybersecurity object. In some embodiments, a detected cybersecurity issue is represented as a node in a security graph, connected to a node representing a resource on which the cybersecurity issue was detected.

In an embodiment, a mitigation instruction corresponding to the risk factor score is executed. In some embodiments, the risk factor is indicated by metadata associated with the detected node of S240. If the detected node corresponds to a previously determined cybersecurity issue execution continues at S260; otherwise, execution continues at S270.

In an embodiment, a vulnerability is represented on the security graph by a node. As an example, a node representing a workload is connected to a node representing a vulnerability. Where a workload node is the detected node, a cybersecurity vulnerability is associated with the code object.

At optional S260 a notification is generated to indicate that a security risk has been detected in the configuration code. In an embodiment the notification is sent to a client device, a user account, a combination thereof, and the like, which authored the code. Code authors are determined, in an embodiment, by a user account identifier present in the configuration code.

In some embodiments, the notification includes an indicator to specify why the notification is generated. In certain embodiments an instruction to perform a mitigation action is generated. In the example above, an alert (i.e., notification) is generated in response to detecting that a workload includes an outdated software version, and the alert includes the current software version which would need to be configured in the configuration code in order to mitigate the risk of deploying a workload with an outdated software version.

At S270 a check is performed to determine if another code object should be inspected. If 'yes' execution continues at S220, otherwise execution terminates.

Figure 3:
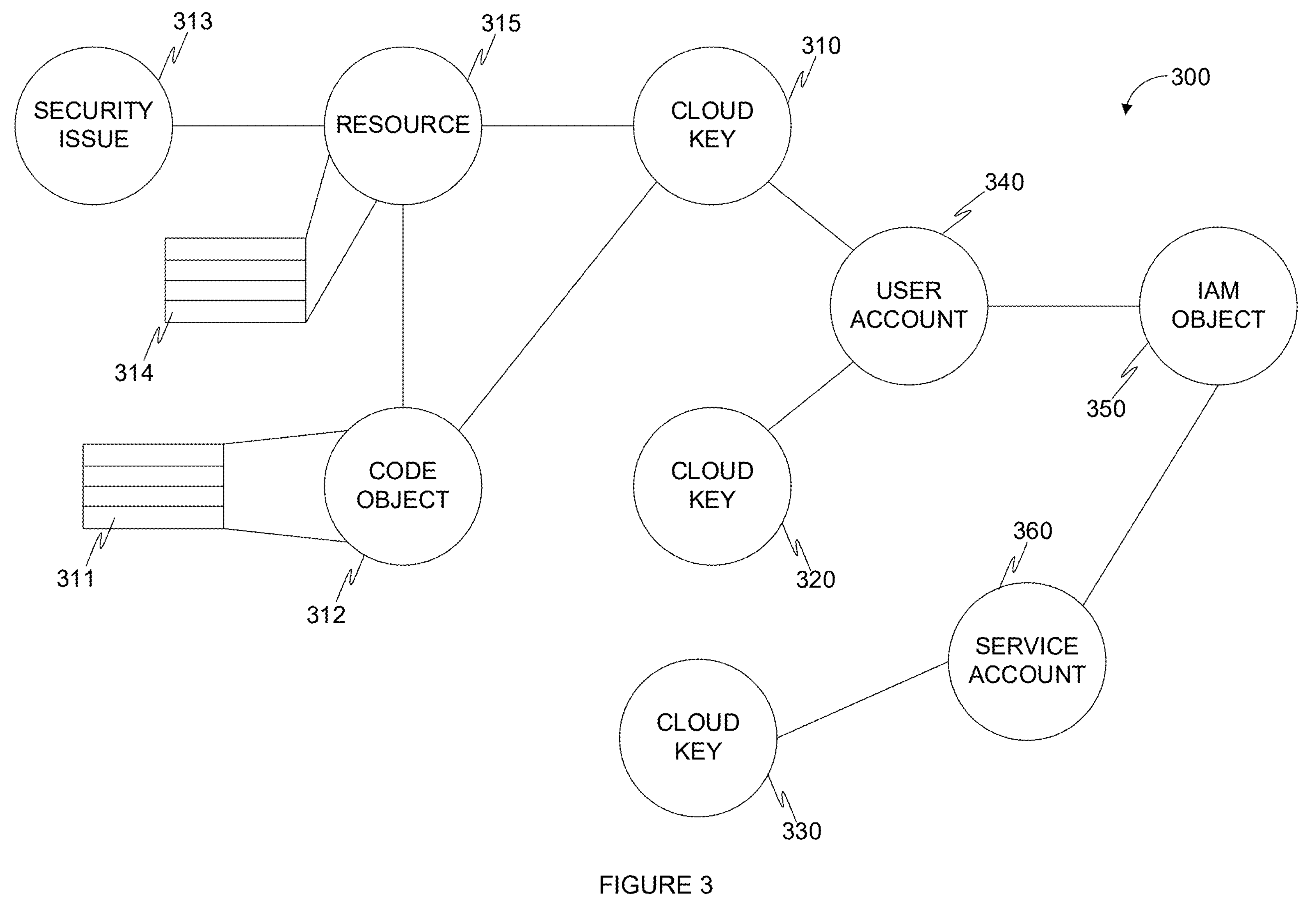
FIG. 3 is a schematic illustration of a portion of a security graph for cybersecurity risk assessment of virtual instances in a cloud computing environment, implemented in accordance with an embodiment.

FIG. 3 is a schematic illustration of a portion of a security graph 300 for cybersecurity risk assessment of virtual instances in a cloud computing environment, implemented in accordance with an embodiment. The graph 300, which in an embodiment is stored in a graph database, includes a plurality of nodes. In an embodiment, a node represents a resource, principal, metadata, enrichment data, and the like.

In an embodiment, the graph 300 includes a first cloud key node 310 (representing a first cloud key) and a second cloud key node 320 (representing a second cloud key), which are connected to a user account node 340 (representing a user account). A third cloud key node 330 (representing a third cloud key) is connected to a service account node 360 (representing a service account). The user account node 340 and service account node 360 are connected to an identity and access management (IAM) object node 350 (representing an IAM object).

In an embodiment, a cloud key provides temporary access, permanent access, and the like, between a first workload and a second workload. In some embodiments, one or more first workloads and one or more second workloads may be on the same tenant, on different tenants, or on a combination thereof. In an embodiment, cloud keys are embedded into text configuration files, structured configuration files (e.g., JSON, YAML, XML, etc.), scripts, source code, and the like. Example implementations of cloud keys include AWS IAM access keys, OAuth® refresh tokens, access tokens, and the like.

By generating a security graph 300 including such nodes and populating it with data representing the cloud computing environment allows assessing of cybersecurity risks. For example, if a first cloud key is compromised, it is readily apparent what other objects are vulnerable as a result, by querying the security graph 300 and detecting cloud entities which are represented by nodes connected to, for example, a node representing the first cloud key. In an embodiment each node further stores metadata and data relating to the object. For example, a cloud key node 320 may include therein a unique account identifier.

In an embodiment, a resource is represented by a resource node 315. The cloud key represented by cloud key node 310 is detected, for example by an inspector, on the resource. In an embodiment, an inspector is configured to generate an instruction which when executed by the graph database causes a connection between the cloud key node 310 and the resource node 315. In certain embodiments, the resource node 315 is a data structure which includes a plurality of data fields, such as first data field 314. A data field receives a value which represents an attribute. For the first data field 314, the value represents an attribute of the resource. For example, a data field is, in an embodiment, a resource type identifier, an application identifier, a VPC identifier, an instance type identifier, and the like.

In an embodiment, a code object is represented by a code object node 312. In some embodiments, a code inspector, such as the code inspector 180 of FIG. 1, is configured to detect code objects in a configuration code, and generate an instruction, which when executed by a graph database, causes the graph database to generate the code object node 312. In an embodiment, a code object includes a plurality of data fields, such as discussed in more detail with respect to FIG. 5 below. In some embodiments, a code object node 312 includes a plurality of data fields, such as second data field 314, populated with values extracted (e.g., by a code inspector) from the configuration code.

In certain embodiments, the code inspector may further query the security graph 300 to detect a resource node having a data field value which matches a data field value of the code object. For example, the value of the first data field 311 matches the value of the second data field 314. In certain embodiments, an edge is generated between the code object node 312 and the resource node 315, in response to determining that the resource represented by the resource node 315 was deployed based on the code object represented by the code object node 312.

In some embodiments, the security graph 300 further includes a representation of a cybersecurity issue, such as security issue node 313. For example, a misconfiguration is represented by a node in the security graph, in an embodiment. In an embodiment the security issue node 313 representing a cybersecurity issue is connected to the resource node 315 which represents a resource. This indicates that the resource includes the cybersecurity issue. For example, an inspector is configured to detect a cybersecurity issue, and detects the cybersecurity issue on a software container which is inspected by the inspector. In an embodiment, a security graph is updated to include a node representing the software container (e.g., resource node 315) connected to a node representing the cybersecurity issue (e.g., security issue node 313). In some embodiments, the code object represented by the code object node 312 is further inspected to determine if the cybersecurity issue represented by security issue node 313 is detected on the resource in response to determining that the resource node 315 is connected to the code object node 312 and the security issue node 313, and that the code object node 312 and the security issue node 313 are not connected to each other.

In certain embodiments, generating a node representing a cybersecurity issue allows to reduce redundant information stored in a graph database, where storing a connection requires less resources than storing information about the cybersecurity issue in each node representing a resource where the cybersecurity issue is detected. This allows compact representation, thereby reducing computer resource consumption. This further allows to rapidly detect all resources having a certain cybersecurity issue, as rather than querying each node to determine if the node includes information on a specific cybersecurity issue, a single node is queried to detect nodes connected to it. This reduces the amount of processing required on a database search.

Figure 4:
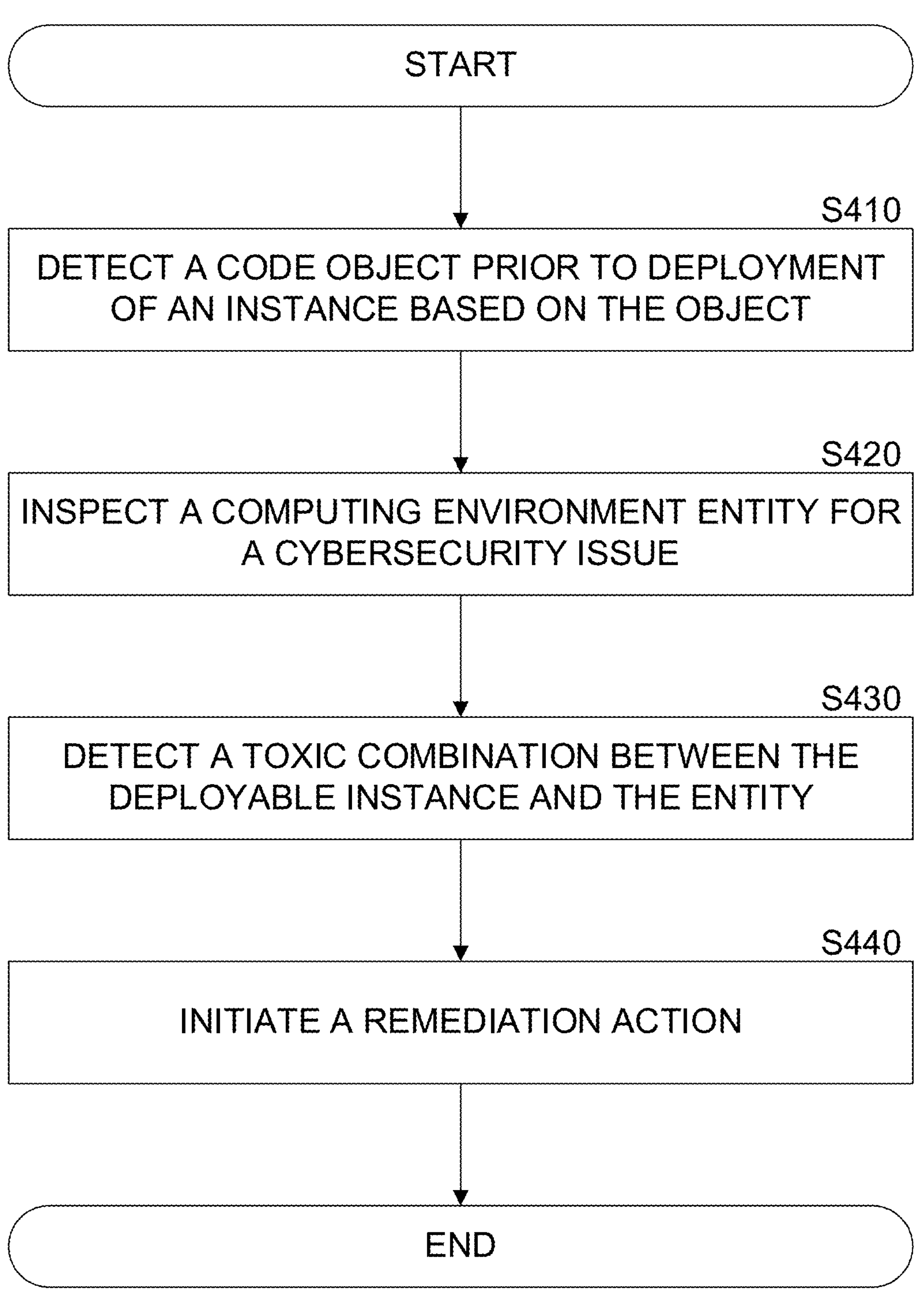
FIG. 4 is a flowchart of a method for detecting a toxic combination prior to deployment of a virtual instance, implemented in accordance with an embodiment.

FIG. 4 is a flowchart of a method for detecting a toxic combination prior to deployment of a virtual instance, implemented in accordance with an embodiment. In an embodiment, detecting a cybersecurity object which indicates a cybersecurity issue, such as a risk, vulnerability, exposure, misconfiguration, etc., is not always enough. For example, in some embodiments, a combination, also referred to as a toxic combination, of detected objects, instances, and the like, indicate together that a cybersecurity issue arises. In certain embodiments, each such detection on its own does not necessarily indicate a problem, but when detected together, under a predefined set of circumstances, such becomes a cybersecurity issue.

At S410, a code object is detected. In an embodiment, the code object is detected prior to deployment of a virtual instance, and entity, and the like, in a computing environment. In some embodiments, the computing environment is a cloud computing environment, and the entity is a resource, a principal, and the like.

While this example embodiment discusses configuration code objects, the teachings herein are applied in certain embodiments to different code objects, software code, application code, and the like code objects which are deployed or otherwise present in a computing environment. In certain embodiments, the teachings herein apply to other findings, such as forensic findings, for example based on event records detected in a log, such as a cloud log.

In an embodiment, an infrastructure as code (IaC) platform is accessed to detect the code object. In some embodiments, an IaC platform is accessed to detect a plurality of code objects, each code object utilized to deploy a unique virtual instance.

According to an embodiment, an IaC platform includes a code library, software library, a combination thereof, and the like. For example, in some embodiments, an IaC platform includes a declaratory code portion, which when utilized by an orchestrator in a cloud computing environment configures the orchestrator to perform any one of: deploying a resource in the cloud computing environment, initiating a principal in the cloud computing environment, a combination thereof, and the like.

In an embodiment, the code object includes a secret, a certificate, an access, a permission, an application, a software library call, a combination thereof, and the like.

At S420, an entity is inspected. In an embodiment, an entity is a resource, a principal, a combination thereof, and the like. In some embodiments, inspecting a resource includes detecting a disk, detecting a database, detecting an application, detecting a cloud computing storage environment, a combination thereof, and the like.

In some embodiments, an inspectable disk is generated based on a detected disk in the cloud computing environment. For example, in an embodiment, a resource is a virtual machine, which is allocated a data disk. In certain embodiments, an inspection controller in an inspection environment is configured to generate an inspectable disk based on the data disk.

In certain embodiments, the inspectable disk is generated by generating a clone of the data disk. In some embodiments, a cloned disk is generated by detecting a disk pointer of the data disk, which points to a storage, such as a cloud computing storage address.

In an embodiment, a cloned disk descriptor is generated, which includes the detected disk pointer of the data disk, such that the data disk and the cloned disk both point to the address of the cloud computing storage system.

According to an embodiment, the cloned disk, a resource allocated to the cloned disk, and the like, is release, deprovisioned, etc., in response to determining that inspection of the cloned disk is complete.

At S430, a toxic combination is detected. In an embodiment, the toxic combination is detected based on the cybersecurity issue and an object detected in the code object. In some embodiments, a toxic combination is a combination of a cybersecurity object and another cybersecurity object. In certain embodiments, the cybersecurity object is of a first type, and the another cybersecurity object is of a second type, which is not the first type.

In an embodiment, a toxic combination is detected based on a detecting a cybersecurity object and an object detected in the code object. For example, in an embodiment, the cybersecurity object is an application, and the object in the code object is a password.

According to an embodiment, a toxic combination is detected based on a detected event and a detected object in a code object prior to deployment. For example, in an embodiment, a potential toxic combination is detected based on detecting an event in a log of computing system (such as a cloud log, e.g., Cloudtrail), and determining that detecting the event together with detecting a resource deployed based on a code object would cause a toxic combination. In such an embodiment, it is advantageous to initiate a remediation action.

At S440, a remediation action is initiated. In an embodiment, the remediation action is initiated on the code object. For example, in some embodiments, the code object is excluded from deployment in a declaratory code in a cloud computing environment. In certain embodiments, the remediation action includes generating an alert indicating that the code object, if deployed, would lead to a potential toxic combination.

In some embodiments, a mitigation action is initiated. For example, in certain embodiments, the mitigation action is initiated on a resource deployed from the code object, on a resource affected by the potential toxic combination, a combination thereof, and the like.

In an embodiment, the remediation action includes generating an alternative code object. For example, according to an embodiment, an alternative code object is generated based on a code object, having a line of code, a plurality of lines of code, a secret, a code portion, and the like, removed from the code object.

In an embodiment, a check is performed on the alternative code object to determine if removal of the code portion, line of code, etc., results in no potential toxic combination. In some embodiments, the process is performed iteratively to remove all code portions, lines of code, etc., which contribute to the toxic combination occurrence.

Figure 5:
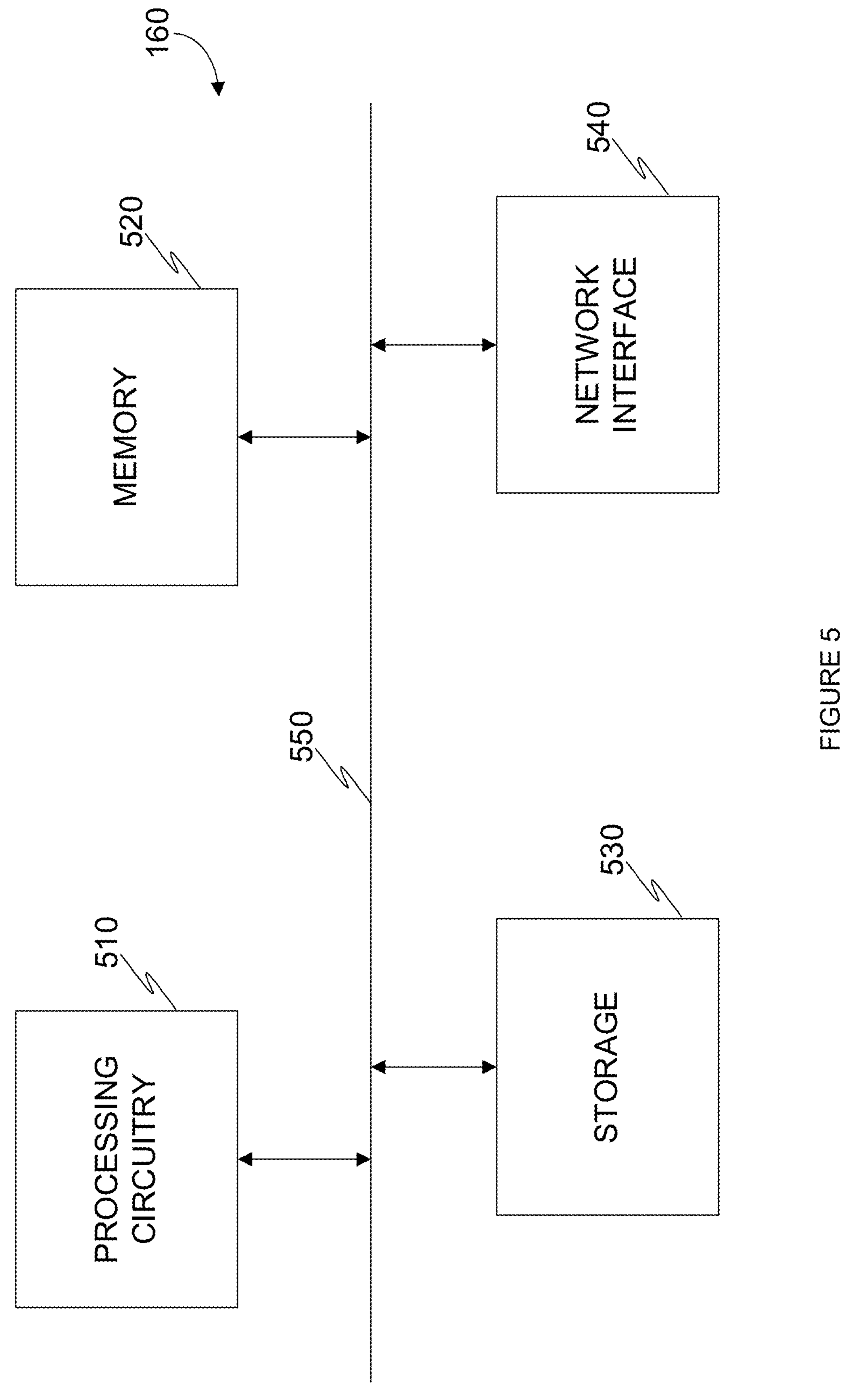
FIG. 5 is an example schematic diagram of a inspector according to an embodiment.

FIG. 5 is an example schematic diagram of a inspector 160 according to an embodiment. The inspector 160 includes, according to an embodiment, a processing circuitry 510 coupled to a memory 520, a storage 530, and a network interface 540. In an embodiment, the components of the inspector 160 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the inspector 160 with communication with, for example, the computing environment 140, the inspection environment 150, and the like, according to an embodiment.

It should be understood that the embodiments described herein are not limited to the specific architecture illustrated in FIG. 5, and other architectures may be equally used without departing from the scope of the disclosed embodiments.

Furthermore, in certain embodiments the code inspector 180, the enricher 165, the policy engine 190, the security graph 170, a combination thereof, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for detecting a cybersecurity toxic combination prior to a virtual instance deployment, comprising:

inspecting an entity in a cloud computing environment for a cybersecurity object;

detecting the cybersecurity object on the inspected entity;

receiving configuration code and extracting a code object from the configuration code by searching text in the configuration code;

inspecting the code object utilized to deploy a virtual instance in the cloud computing environment prior to deployment of the virtual instance;

detecting a toxic combination cybersecurity issue based on the cybersecurity object and the code object; and initiating a mitigation action on the code object.

2. The method of claim 1, further comprising:

initiating the mitigation action to stop deployment of the virtual instance based on the code object.

3. The method of claim 1, further comprising:

generating a representation of the computing environment in a security database based on a unified data schema; and generating a representation of: the inspected entity, the cybersecurity object, the code object, and the toxic combination cybersecurity issue in the security database.

4. The method of claim 1, further comprising:
detecting in the code object a second cybersecurity object, the second cybersecurity object indicating a toxic combination with the detected cybersecurity object.

5. The method of claim 4, further comprising:
generating a new code object based on the code object; and
removing the second cybersecurity object from the new code object.

6. The method of claim 1, further comprising:
initiating a remediation action based on the detected cybersecurity object on the inspected entity.

7. The method of claim 1, further comprising:
generating an inspectable disk based on an original disk connected to the inspected entity;
inspecting the inspectable disk for the cybersecurity object.

8. The method of claim 7, further comprising:
releasing the inspectable disk in response to determining that inspection is completed.

9. The method of claim 1, further comprising:
accessing an infrastructure as code (IaC) environment, the IaC environment including a plurality of code objects, each code object corresponding to a deployable virtual instance; and
inspecting each code object of the plurality of code objects.

10. The method of claim 9, further comprising:
determining for each code object a potential toxic combination issue based on the each code object and an entity in the cloud computing environment.

11. A non-transitory computer-readable medium storing a set of instructions for detecting a cybersecurity toxic combination prior to a virtual instance deployment, the set of instructions comprising:
one or more instructions that, when executed by one or more processors of a device, cause the device to:
inspect an entity in a cloud computing environment for a cybersecurity object;
detect the cybersecurity object on the inspected entity;
receive configuration code and extract a code object from the configuration code by searching text in the configuration code;
inspect the code object utilized to deploy a virtual instance in the cloud computing environment prior to deployment of the virtual instance;
detect a toxic combination cybersecurity issue based on the cybersecurity object and the code object; and
initiate a mitigation action on the code object.

12. A system for detecting a cybersecurity toxic combination prior to a virtual instance deployment comprising:
a processing circuitry;
a memory, the memory containing instructions that, when executed by the processing circuitry, configure the system to:
inspect an entity in a cloud computing environment for a cybersecurity object;
detect the cybersecurity object on the inspected entity;
receive configuration code and extract a code object from the configuration code by searching text in the configuration code;
inspect the code object utilized to deploy a virtual instance in the cloud computing environment prior to deployment of the virtual instance;
detect a toxic combination cybersecurity issue based on the cybersecurity object and the code object; and
initiate a mitigation action on the code object.

13. The system of claim 12, wherein the memory contains further instructions which when executed by the processing circuitry further configure the system to:
initiate the mitigation action to stop deployment of the virtual instance based on the code object.

14. The system of claim 12, wherein the memory contains further instructions which when executed by the processing circuitry further configure the system to:
generate a representation of the computing environment in a security database based on a unified data schema; and
generate a representation of:
the inspected entity, the cybersecurity object, the code object, and the toxic combination cybersecurity issue in the security database.

15. The system of claim 12, wherein the memory contains further instructions which when executed by the processing circuitry further configure the system to:
detect in the code object a second cybersecurity object, the second cybersecurity object indicating a toxic combination with the detected cybersecurity object.

16. The system of claim 15, wherein the memory contains further instructions which when executed by the processing circuitry further configure the system to:
generate a new code object based on the code object; and
remove the second cybersecurity object from the new code object.

17. The system of claim 12, wherein the memory contains further instructions which when executed by the processing circuitry further configure the system to:
initiate a remediation action based on the detected cybersecurity object on the inspected entity.

18. The system of claim 12, wherein the memory contains further instructions which when executed by the processing circuitry further configure the system to:
generate an inspectable disk based on an original disk connected to the inspected entity; and
inspect the inspectable disk for the cybersecurity object.

19. The system of claim 18, wherein the memory contains further instructions which when executed by the processing circuitry further configure the system to:
release the inspectable disk in response to determining that inspection is completed.

20. The system of claim 12, wherein the memory contains further instructions which when executed by the processing circuitry further configure the system to:
access an infrastructure as code (IaC) environment, the IaC environment including a plurality of code objects, each code object corresponding to a deployable virtual instance; and
inspect each code object of the plurality of code objects.

21. The system of claim 20, wherein the memory contains further instructions which when executed by the processing circuitry further configure the system to:
determine for each code object a potential toxic combination issue based on the each code object and an entity in the cloud computing environment.

* * * * *